(12) United States Patent
Tang

(10) Patent No.: US 11,394,696 B2
(45) Date of Patent: Jul. 19, 2022

(54) RESOURCE REQUEST METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/459,416

(22) Filed: Aug. 27, 2021

(65) Prior Publication Data

US 2021/0392119 A1    Dec. 16, 2021

Related U.S. Application Data

(63) Continuation of application No. PCT/CN2020/070914, filed on Jan. 8, 2020.

(30) Foreign Application Priority Data

Feb. 28, 2019 (CN) .......................... 201910152554.6

(51) Int. Cl.
*H04L 29/06* (2006.01)
*H04L 9/30* (2006.01)
*H04L 9/08* (2006.01)
*H04L 9/40* (2022.01)

(52) U.S. Cl.
CPC .......... *H04L 63/0435* (2013.01); *H04L 9/088* (2013.01); *H04L 9/30* (2013.01); *H04L 63/0442* (2013.01)

(58) Field of Classification Search
CPC ....... H04L 63/0435; H04L 9/088; H04L 9/30; H04L 63/0442
See application file for complete search history.

(56) References Cited

U.S. PATENT DOCUMENTS 9,894,067 B1 *  2/2018  Mandadi ............. H04L 63/0807
9,900,160 B1 *  2/2018  Barbour ................ H04L 9/0822
10,182,044 B1 * 1/2019  Praus ...................... H04L 63/08
(Continued)

FOREIGN PATENT DOCUMENTS

| CN | 103166931 A | 6/2013 |
| CN | 107493294 A | 12/2017 |
| CN | 107659406 A | 2/2018 |
| CN | 108206992 A | 6/2018 |
| CN | 110035058 A | 7/2019 |
| WO | 2018208286 A1 | 11/2018 |

OTHER PUBLICATIONS

OCF Security Specification, version 2.0.1, Feb. 11, 2019. (Year: 2019).*

(Continued)

*Primary Examiner* — Yonas A Bayou
(74) *Attorney, Agent, or Firm* — Ladas & Parry LLP

(57) ABSTRACT

Embodiments of the present application provide a resource request method, a device, and a storage medium, where the method applied to a control device includes: generating a resource collection request message, the resource collection request message including a resource request for at least one remote reference node and corresponding first check data of the resource request, and sending the resource collection request message to a resource collection device.

16 Claims, 9 Drawing Sheets

(56) References Cited

U.S. PATENT DOCUMENTS

| | | | |
|---|---|---|---|
| 10,277,569 B1* | 4/2019 | Barbour | H04L 67/142 |
| 2018/0063879 A1 | 3/2018 | Lee | |
| 2019/0014117 A1 | 1/2019 | Li et al. | |
| 2020/0195514 A1* | 6/2020 | Agerstam | H04W 4/70 |
| 2021/0100018 A1* | 4/2021 | Wu | H04W 72/1273 |
| 2021/0234940 A1* | 7/2021 | Broome | H04L 67/32 |
| 2021/0250652 A1* | 8/2021 | Oztaskent | H04N 21/4722 |
| 2021/0289489 A1* | 9/2021 | Liu | H04W 72/0466 |
| 2021/0298040 A1* | 9/2021 | Zhao | H04W 72/0406 |

OTHER PUBLICATIONS

International Search Report (ISR) dated Mar. 26, 2020 for Application No. PCT/CN2020/070914.

The First Office Action of corresponding Chinese application No. 201910152554.6, dated Feb. 6, 2020.

«Proceedings of 2018 China home appliance technology conference» : "Research on interconnection between OCF and Haier U +".

«2017 International Conference on Infamnation and Communication Technology Convergence (ICTC)» :"Bridging OCF devices to legacy IoT devices".

The Second Office Action of corresponding Chinese application No. 201910152554.6, dated Jul. 24, 2020.

The Third Office Action of corresponding Chinese application No. 201910152554.6, dated Dec. 23, 2020.

«https://standards.iso.org/ittf/PubliclyAvailableStandards/index.html» :"ISO_IEC_30118-1_2018".

The Notice of Allowance of corresponding Chinese application No. 201910152554.6, dated Apr. 2, 2021.

The EESR of corresponding European application No. 20763140.9, dated Feb. 7, 2022.

The first Office Action of corresponding Indian application No. 202117038915, dated Mar. 25, 2022.

* cited by examiner

RESOURCE REQUEST METHOD, DEVICE AND STORAGE MEDIUM

CROSS-REFERENCE TO RELATED APPLICATIONS

This application is a continuation of International Application No. PCT/CN2020/070914, filed on Jan. 8, 2020, which claims priority to Chinese application No. 2019101525546, filed on Feb. 28, 2019, entitled "RESOURCE REQUEST METHOD, DEVICE AND STORAGE MEDIUM". The disclosures of the aforementioned applications are hereby incorporated by reference in their entireties.

TECHNICAL FIELD

Embodiments of the present application relate to Internet of Things technology, in particular, to a resource request method, a device, and a storage medium.

RELATED ART

Open Connectivity Foundation (English: Open Connectivity Foundation, for short: OCF) is one of the largest industrial connectivity and interoperability standard organizations for Internet of Things devices. An OCF network includes an original client (English: Original Client, for short: OC), a remote reference host (English: Remote Reference Host, for short: RRH), and a collection host (English: Collection Host, for short: CH).

Where the OC is used to operate an RRH resource and the OC can operate a plurality of RRH resources; various functions of the RRH are called RRH resources, and the OC and the RRH are connected and communicated through the CH; and the CH is used to perform unified management to a local resource and an RRH resource. An OC can be a control device, such as a smart phone, a computer or the like; a CH can be a connection device, such as a home gateway or the like; and an RRH can be an intelligent device that provides various services, for example, a smart desk lamp, a smart speaker, a smart air conditioner or the like. When the OC needs to operate an RRH resource, the OC sends a collection (collection) resource request to the CH, and the CH verifies whether the OC has a right to access an RRH resource. If yes, the CH decomposes the collection resource request into requests for respective RRH resources, and sends a resource request to the RRH, which returns a resource response to the CH, the CH integrates the resource responses from respective RRHs and returns it to the OC as a whole.

However, an existing communication solution makes security of data transmitted between the OC and the RRH low.

SUMMARY

Embodiments of the present application provide a resource request method, a device, and a storage medium.

According to a first aspect, an embodiment of the present application may provide a resource request method applied to a control device, the method including:

generating a resource collection request message, the resource collection request message including a resource request for at least one remote reference node and corresponding first check data of the resource request; and sending the resource collection request message to a resource collection device.

According to a second aspect, an embodiment of the present application may provide a resource request method applied to a remote reference node, the method including:

receiving a resource request message sent by a resource collection device, the resource request message including a resource request for the remote reference node and corresponding first check data of the resource request; and decrypting the first check data with a decryption key.

According to a third aspect, an embodiment of the present application may provide a control device, including:

a processor, a memory, and an interface for communicating with a network device;

the memory stores a computer executable instruction; and the processor executes the computer executable instruction stored in the memory, causing the processor to execute the resource request method according to the first aspect.

According to a fourth aspect, an embodiment of the present application may provide a remote reference node, including:

a processor, a memory and an interface for communicating with a terminal device;

the memory stores a computer executable instruction; and the processor executes the computer executable instruction stored in the memory, causing the processor to execute the resource request method according to the second aspect.

According to a fifth aspect, an embodiment of the present application may provide a computer readable storage medium, the computer readable storage medium storing a computer executable instruction, and when the computer executable instruction is executed by a processor, the resource request method according to the first aspect being implemented.

According to a sixth aspect, an embodiment of present application may provide a computer readable storage medium, the computer readable storage medium storing a computer executable instruction, and when the computer executable instruction is executed by a processor, the resource request method according to the second aspect being implemented.

BRIEF DESCRIPTION OF DRAWINGS

In order to explain embodiments of the present application or a technical solution in the related art more clearly, drawings required in the embodiments or a description of the related art will be briefly introduced below. Obviously, drawings in a following description are some embodiments of the present application, and other drawings may be obtained by persons of ordinary skills in the art according to these drawings without paying creative labor.

DESCRIPTION OF EMBODIMENTS

In order to make a purpose, a technical solution, and an advantage of embodiments of the present application clearer, the technical solution of the embodiments of the present application will be described clearly and completely in conjunction with drawings in the embodiments of the present application. Obviously, described embodiments are part of the embodiments of the present application, not all of the embodiments. Based on the embodiments in the present application, all other embodiments obtained by persons of ordinary skills in the art without creative labor belong to protection scope of the present application.

Terms "first", "second", etc. in a specification, a claim, and drawings described above of the embodiments in the present application are used to distinguish similar objects, and are not necessary to be used to describe a specific order or sequence. It should be understood that data thus used may be interchanged under an appropriate circumstance, so that the embodiments of the present application described herein can be implemented in an order other than those illustrated or described herein. In addition, terms "including" and "having" and any variations thereof are intended to cover non-exclusive inclusion. For example, a process, a method, a system, a product, or a device including a series of steps or units are not necessary to be limited to those steps or units clearly listed, but may include other steps or units not clearly listed or inherent to the process, the method, the product, or the device.

Figure 1:
FIG. 1 is a schematic diagram of a network architecture applicable to an embodiment of the present application.

FIG. 1 is a schematic diagram of a network architecture applicable to an embodiment of the present application. As shown in FIG. 1, the network architecture at least includes a control device 11, a resource collection device 12, and a remote reference node 13. It can be understood that in actual network deployment, there may be one or more control devices 11, resource collection devices 12, and remote reference nodes 13, and FIG. 1 only takes one as an example.

The control device 11 and the resource collection device 12 may be connected or communicate in a wired or wireless manner. Similarly, the resource collection device 12 and the remote reference node 13 can also be connected or communicate in a wired or wireless manner.

The control device 11 accesses and operates a resource provided by the remote reference node 13 through the resource collection device 12, and each remote reference node 13 may provide one or more resources, which may be a function of the remote reference node 13. The resource collection device 12 is used to perform unified management to a local resource and the resource provided by the remote reference node 13, and provides an interface for the control device 11 to access a resource.

Figure 2:
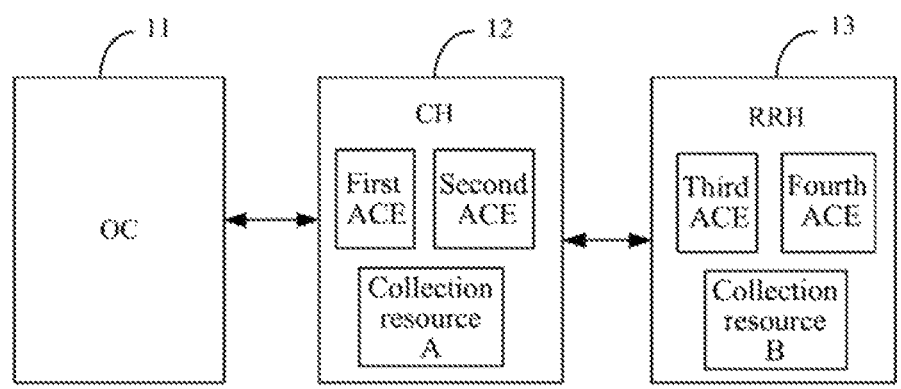
FIG. 2 is a schematic diagram of an application layer of each device in an OCF network.

As shown in FIG. 2, the network architecture may be an OCF network, and accordingly, the control device 11 is an OC, the resource collection device 12 is a CH, and the remote reference node 13 is an RRH. It can be understood that the network architecture is not limited to an OCF network, but can further be: a smart device which is used as a client and a server and controlled by an intermediate device (whose function is similar to a CH) under an Internet of Things environment.

Taking an OCF network as an example, an OC may be a smart phone, a personal computer, a tablet computer, etc., a CH may be a home gateway or other gateway devices, and an RRH may be a smart home appliances device, such as a smart desk lamp, a smart refrigerator, a smart speaker, etc.

FIG. 2 is a schematic diagram of an application layer of each device in an OCF network. As shown in FIG. 2, the CH includes a first access control entry (English: Access Control Entry, for short: ACE), a second ACE, and a collection resource (collection resource) A. Where the first ACE defines the collection resource A allowed to be accessed by the OC, the collection resource A is a local resource of the CH; the second ACE defines a collection resource B allowed to be accessed by the OC, and the collection resource B is a resource of the RRH.

For example, the first ACE includes information of the collection resource A and an ID or a rule of the OC allowed to access, and the second ACE includes information of the collection resource B and the ID or the rule of the OC allowed to access.

When receiving a collection resource request message sent by the OC, the CH determines whether the OC matches with the first ACE and the second ACE. If so, the CH decomposes and encapsulates the collection resource request message, obtains a resource request for the RRH, and sends the resource request for the RRH to the RRH.

The RRH includes a third ACE, the third ACE defines the collection resource B that is allowed to be accessed by the CH, and in at least one embodiment, the RRH further includes a fourth ACE, the fourth ACE defines the collection resource B that is allowed to be accessed by the OC. When receiving a resource access request message sent by the CH, the RRH determines, according to the third ACE, whether to execute the request and returns a response to the CH. The CH collects all responses, and then packages them as a whole and sends them to the OC.

The CH includes one or more collection resources, each collection resource includes one or more link resources, each link resource is an address or an index of a local resource of the CH or a resource of the RRH.

For example, a collection resource includes a link of a switching resource in a device A (light) and a link of a switching resource in a device B (fan), thus forming a centralized resource group. The OC may request a plurality of resources at the same time by accessing an oic.if.b interface of the collection resource. The CH may send a request to a respective resource in links, collect a response returned by the respective resource, and return it to the OC after unified concentration.

In the related art, there is a risk that the CH is illegally controlled, which leads to tampering of a resource request message received by the RRH or tampering of a collection resource response message received by the OC. In order to solve problems in the related art, the present application provides a resource request method.

Figure 3:
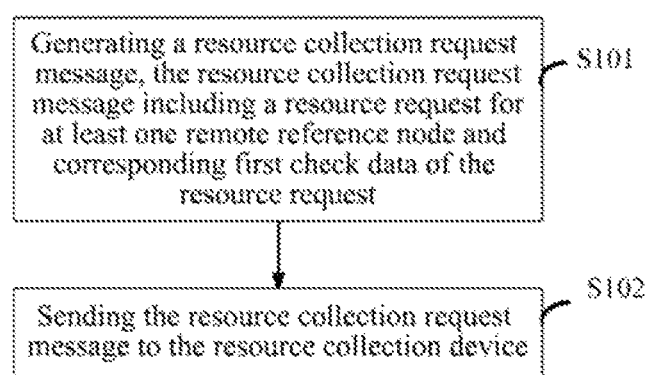
FIG. 3 is a schematic flowchart of a resource request method provided in Embodiment 1 of the present application.

FIG. 3 is a schematic flowchart of a resource request method provided in Embodiment 1 of the present application, and the embodiment describes the method from a perspective of a control device. As shown in FIG. 3, the method provided in the present embodiment includes following steps:

S101, the control device generates a resource collection request message, the resource collection request message including a resource request for at least one remote reference node and corresponding first check data of the resource request.

Different from the related art, in the present embodiment, the resource collection request message carries the first check data corresponding to the resource request for the remote reference node, and the first check data is used for the remote reference node to verify whether a source of the resource request is reliable, i.e., the remote reference node verifies whether the resource request is sent by the control device instead of other devices according to the first check data. The resource request message further includes other information, for example, an identifier of the control device.

When the method in the present embodiment is applied in an OCF network, the resource collection request message may be a collection resource request message.

The first check data may be obtained by encrypting the resource request for the remote reference node with an encryption key by the control device. Or, the first check data is obtained by encrypting first information in the resource request for the remote reference node with an encryption key by the control device, and the first information is used to identify resource requests for different remote reference nodes, and other information in the resource request except the first information may be called second information. In at least one embodiment, the first information may be multiple pieces of information.

The encryption key may be determined by the control device and the remote reference node through negotiation in advance, or configured by other management devices for the control device, or configured manually by a worker.

The control device may use the encryption key to encrypt the resource request for the remote reference node as a whole, or may encrypt the first information in the resource request for the remote reference node. In the present embodiment, the first information is not limited as long as the first information can identify resource requests for different remote reference nodes, for example, the first information is an address of a resource.

In the present embodiment, the control device and the remote reference node may adopt a symmetric encryption algorithm or an asymmetric encryption algorithm.

The key used in the symmetric encryption algorithm is a shared key between the control device and the remote reference node, and the shared key means that the control device and the remote reference node use the same key. The shared key is used to encrypt the resource request for the remote reference node to obtain the first check data, and accordingly, the remote reference node decrypts the first check data with the shared key.

In at least one embodiment, the shared key is a key shared by the control device and a plurality of remote reference nodes. In this way, a plurality of different remote reference nodes uses the same key.

Or, the control device stores a plurality of different shared keys, each of the plurality of shared keys corresponds to a remote reference node, i.e., different remote reference nodes use different keys.

In the asymmetric encryption algorithm, the control device and the remote reference node use different keys for encryption and decryption. In the present embodiment, a pair of public key and private key are respectively configured for the control device and the remote reference node, and data encrypted with the private key can only be decrypted with the corresponding public key. Similarly, data encrypted with the public key can only be decrypted with the corresponding private key.

In various embodiments of the present application, a public key configured for the control device is called a first public key, and a private key configured for the control device is called a first private key. Data encrypted by the first private key can only be decrypted by the first public key, and data encrypted by the first public key can only be decrypted by the first private key. The first private key is stored in a security area of the control device and can only be invoked by the control device.

A public key configured for the remote reference node is called a second public key, and a private key configured for the remote reference node is called a second private key. Data encrypted by the second private key can only be decrypted by the second public key, and data encrypted by the second public key can only be decrypted by the second private key. The second private key is stored in a security area of the remote reference node and can only be invoked by the remote reference node.

In the present embodiment, the control device further stores the second public key, and the remote reference node further stores the first public key.

In the present embodiment, the control device encrypts the resource request for the remote reference node or the first information in the resource request with the first private key to obtain the first check data. Accordingly, the remote reference node can decrypt the first check data only with the first public key.

In at least one embodiment, the first check data further includes an identifier of the resource request for the remote reference node, the identifier of the resource request is used by the remote reference node to determine whether the resource request is a replay request. If the first check data includes the identifier of the resource request for the remote reference node, when generating the first check data, the control device encrypts the resource request for the remote reference node (or the first information in the resource request) together with the identifier of the resource request with the encryption key to obtain the first check data.

The resource collection device may cache the resource request for the remote reference node. If the resource collection device is illegally controlled, the resource collection device may repeatedly send a previously cached resource request for the remote reference node as a replay attack. The replay attack is further called a rebroadcast attack or a playback attack. The replay attack is mainly used in a process of identity authentication to destroy correctness of the authentication.

In the present embodiment, for each resource request, the control device generates an identifier of the resource request, the identifier of the resource request is used to uniquely identify a resource request. The identifier of the resource request is encrypted together with the resource request for the remote reference node (or the first information in the resource request), thus preventing the identifier of the resource request from being tampered with.

The remote reference node obtains the identifier of the resource request through decryption and determines whether the identifier of the resource request is a new identifier. If the identifier of the resource request is a new identifier, it is determined that the resource request is not a replay message; if the identifier of the resource request is not a new identifier, it is determined that the resource request is a replay message. The identifier of the resource request is not a new identifier, which means that the identifier of the resource request has been sent, so it can be determined that the resource request is a replay message. The remote reference node processes according to a determining result.

In at least one embodiment, the identifier of the resource request is a serial number or a timestamp. The serial number may be generated according to a preset rule, for example, adding one to a previous serial number every time. Or the serial number may also be generated randomly. The timestamp may be a generated time of the resource request for the remote reference node or a generated time of the resource collection request message.

S102, the control device sends the resource collection request message to the resource collection device.

The control device sends the resource collection request message to the resource collection device, the resource collection device decomposes the resource collection request message into a resource request message for each remote reference node, the resource request message for each remote reference node including a resource request for the remote reference node and first check data of the resource request, and sends a corresponding resource request message to each remote reference node, and the resource request further includes an identifier of the control device.

The resource collection device decomposes and recombines the resource collection request message to obtain the resource request message for each remote reference node. Reference may be made to existing technologies for the decomposition and recombination methods, which will not be described in detail herein.

In the present embodiment, the control device generates a resource collection request message and sends the resource collection request message to a resource collection device, the resource collection request message including a resource request for at least one remote reference node and corresponding first check data of the resource request. Therefore, the remote reference node verifies whether a source of the resource request is reliable according to the first check data, thus improving security of data transmission.

Figure 4:
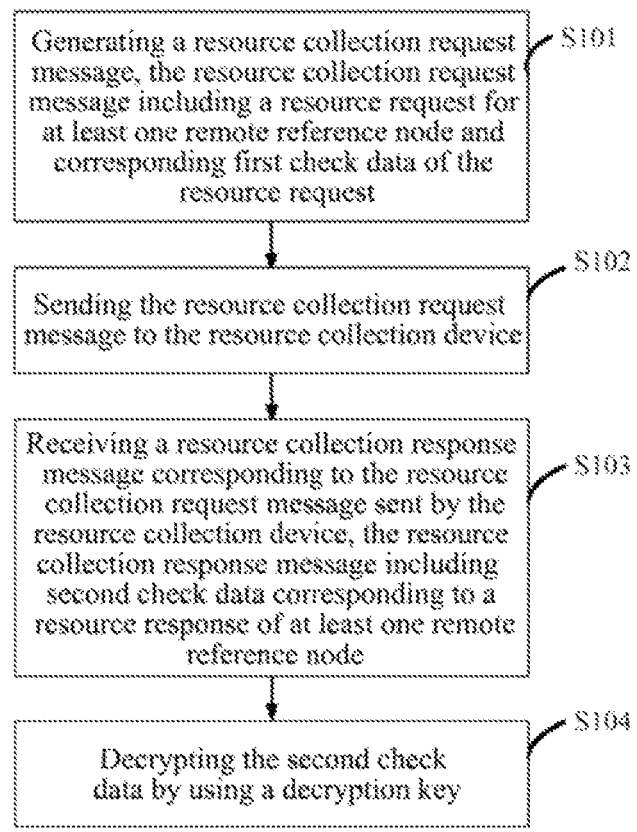
FIG. 4 is yet another schematic flowchart of a resource request method provided in Embodiment 2 of the present application.

FIG. 4 is yet another schematic flowchart of a resource request method provided in Embodiment 2 of the present application. On the basis of Embodiment 1, the remote reference node may encrypt the resource response, and correspondingly, the control device decrypts the resource response to verify whether a source of the resource response is reliable. As shown in FIG. 4, the method of the present embodiment, on the basis of Embodiment 1, further includes following steps:

S103, the control device receives a resource collection response message corresponding to the resource collection request message sent by the resource collection device, the resource collection response message including second check data corresponding to a resource response of at least one remote reference node.

The resource collection response message is obtained by combining, by the resource collection device, resource response messages sent by the at least one remote reference node. When the method in the present embodiment is applied in an OCF network, the resource collection response message may be a collection resource response message.

S104, the control device decrypts the second check data with a decryption key.

The control device verifies whether a source of the resource response is reliable according to a decrypting result. For example, if the control device can successfully decrypt the second check data with the decryption key, it is determined that the source of the resource response is reliable; and if the control device cannot successfully decrypt the second check data with the decryption key, it is determined that the source of the resource response is unreliable.

When a symmetric encryption algorithm is adopted, the decryption key is a shared key between the control device and the remote reference node. The shared key may be a key shared by the control device and a plurality of remote reference nodes, or the control device stores a plurality of different shared keys, and each of the shared keys corresponds to a remote reference node. The control device queries a corresponding shared key according to an identifier of the remote reference node, and performs decryption with the shared key corresponding to the remote reference node, the identifier of the remote reference node being carried in the resource collection request message.

In at least one embodiment, when a symmetric encryption algorithm is adopted, the resource collection request message further includes a plaintext resource response.

When an asymmetric encryption algorithm is used, in an implementation, the decryption key includes a first private key and a second public key.

Accordingly, the control device performs decryption with following manners: performing a first decryption on the second check data with the first private key to obtain a resource response of the remote reference node and first encrypted data; determining the second public key according to the identifier of the remote reference node; and performing a second decryption on the first encrypted data with the second public key to obtain a resource response of the remote reference node. Since public keys of the plurality of remote reference nodes are stored on the control device, the second public key needs to be determined according to an identifier of the remote reference node.

In at least one embodiment, the control device further compares the resource response of the remote reference node obtained through the first decryption with the resource response of the remote reference node obtained through the second decryption, and determines that the resource response of the remote reference node is correct when the resource response of the remote reference node obtained through the first decryption is the same as the resource response of the remote reference node obtained through the second decryption.

In this way, the remote reference node encrypts the resource response with the first public key, so that other nodes in a network cannot obtain the resource response.

If the resource response of the remote reference node obtained through the first decryption is different from the resource response of the remote reference node obtained through the second decryption, it is determined that the resource response of the remote reference node is incorrect.

When an asymmetric encryption algorithm is adopted, in another way, the decryption key includes a second public key, and the resource response message further includes a resource response of at least one remote reference node. The control device determines the second public key according to an identifier of the remote reference node, and decrypts the second check data with the second public key to obtain a resource response of the remote reference node.

In this way, the resource response of the remote reference node included in the resource collection response message is plaintext data, i.e., the remote reference node only signs the resource response, and the control device may further determines whether a source of a message is the remote reference node by virtue of a signature. However, a plaintext resource response carried in the resource collection response message may be tampered with by other nodes in the network.

In at least one embodiment, the control device compares the resource response of the remote reference node included in the resource collection response message with the resource response of the remote reference node obtained through decryption, and determines that the resource response of the remote reference node is correct when the resource response included in the resource collection response message is the same as the resource response of the remote reference node obtained through decryption. If the resource response included in the resource collection response message is different from the resource response of the remote reference node obtained through decryption, it is determined that the resource response of the remote reference node is incorrect and is tampered with by other nodes.

In at least one embodiment, the second check data further includes an identifier of the resource response of the remote reference node, the identifier of the resource response being used to determine whether the resource response is a replay message.

Accordingly, the control device determines whether the resource response of the remote reference node is a replay message according to the identifier of the resource response of the remote reference node, when the resource response of the remote reference node is a replay message, the flow ends; and when the resource response of the remote reference node is not a replay message, it is verified whether the resource response of the remote reference node is correct according to data obtained through decryption.

Where a manner in which the control device determines whether the resource response is a replay message is the same as a manner in which the remote reference node determines whether the resource request is a replay message, which is not described in detail herein.

In at least one embodiment, the identifier of the resource response is a serial number or a timestamp. It can be understood that the identifier of the resource response may or may not be associated with an identifier of a corresponding resource request.

When the identifier of the resource response can be associated with the identifier of the corresponding resource request, the identifier of the resource response can be the same as the identifier of the corresponding resource request. The identifier of the resource response may also be calculated according to a certain rule based on the identifier of the resource request. For example, when the identifier of the resource request is a serial number, the identifier of the resource response can be N plus the serial number carried in the resource request message, N being greater than or equal to 1. When the identifier of the resource request is a timestamp, the identifier of the resource response may be obtained by adding a preset time to the timestamp carried in the resource request message.

In the present embodiment, the control device receives a resource collection response message corresponding to a resource collection request message sent by the resource collection device, the resource collection response message including second check data corresponding to a resource response of at least one remote reference node, decrypts the second check data with a decryption key, and determines that a source of the resource response is reliable if a decryption is successful, thus improving security of data transmission.

Figure 5:
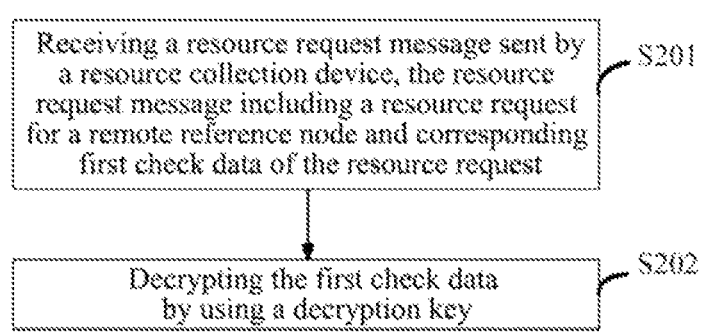
FIG. 5 is another schematic flowchart of a resource request method provided in Embodiment 3 of the present application.

FIG. 5 is another schematic flowchart of a resource request method provided in Embodiment 3 of the present application. The present embodiment describes the method from a perspective of a remote reference node. As shown in FIG. 5, the method in the present embodiment includes following steps:

S201, the remote reference node receives a resource request message sent by a resource collection device, the resource request message including a resource request for the remote reference node and corresponding first check data of the resource request.

The first check data is obtained by encrypting, by a control device with an encryption key, the resource request for the remote reference node, or the first check data is obtained by encrypting, by the control device, first information in the resource request for the remote reference node.

S202, the remote reference node decrypts the first check data with a decryption key.

The remote reference node verifies whether a source of the resource request is reliable according to a decrypting result. If the remote reference node successfully decrypts the first check data with the decryption key, it is determined that the source of the resource request is reliable; and if a decryption performed by the remote reference node with the decryption key fails, it is determined that the source of the resource request is unreliable.

The decrypting result includes a resource request for the remote reference node or the first information in the resource request for the remote reference node.

In at least one embodiment, if the decrypting result includes the resource request for the remote reference node, the remote reference node may compare a decrypted resource request with a plaintext resource request included in the resource request message to verify reliability of the resource request.

When a symmetric encryption algorithm is adopted, the decryption key is a shared key between the control device and the remote reference node. In at least one embodiment, the shared key is a key shared by the control device and a plurality of remote reference nodes, or the shared key is different from shared keys corresponding to other remote reference nodes, i.e., each remote reference node corresponds to a shared key, and a plurality of shared keys corresponding to the plurality of remote reference nodes are different.

When an asymmetric encryption algorithm is adopted, the first check data is encrypted by a first private key, and accordingly, the decryption key is a first public key.

In at least one embodiment, the first check data further includes an identifier of the resource request for the remote reference node, the identifier of the resource request being used to determine whether the resource request is a replay message.

The remote reference node performs decryption to obtain the identifier of the resource request, determines whether the resource request is a replay message according to the identifier of the resource request, and verifies whether the resource request for the remote reference node is correct when the resource request is not a replay message. When the resource request is a replay message, the flow ends, and in at least one embodiment, a replay event may be reported to a management device.

The remote reference node determines whether the resource request is a replay message by determining whether the identifier of the resource request is a new identifier. The remote reference node may determine whether the identifier of the resource request is a new identifier in following manners:

(1) when the identifier of the resource request is a timestamp, the remote reference node determines whether the timestamp carried in a current resource request is greater than that carried in a previous resource request, and if the timestamp carried in the current resource request is greater than that carried in the previous resource request, it is determined that the identifier of the current resource request is a new identifier. If the timestamp carried in the current resource request is not greater than (less than or equal to) the timestamp carried in the previous resource request, it is determined that the identifier of the current resource request is not a new identifier;

every time receiving a new resource request, the remote reference node saves a timestamp carried in the resource request for a next determination;

(2) when the identifier of the resource request is a serial number, if a serial number generated by the control device increases according to a certain rule, the remote reference node determines whether a current serial number carried in the current resource request is a value obtained by increasing a serial number carried in the previous resource request, if so, it is determined that the identifier of the current resource request is a new identifier, otherwise, it is determined that the identifier of the current resource request is not a new identifier.

Or, the remote reference node determines whether the current serial number carried in the current resource request is the same as a serial number carried in a received resource request stored locally. If not, it is determined that the identifier of the current resource request is a new identifier; if so, it is determined that the identifier of the current resource request is not a new identifier.

In the present embodiment, the remote reference node receives a resource request message sent by the resource collection device, the resource request message including a resource request for the remote reference node and corresponding first check data of the resource request, decrypts the first check data with a decryption key, and verifies whether a source of the resource request is reliable according to a decrypting result, thus improving security of data transmitted between the control device and the remote reference node.

Figure 6:
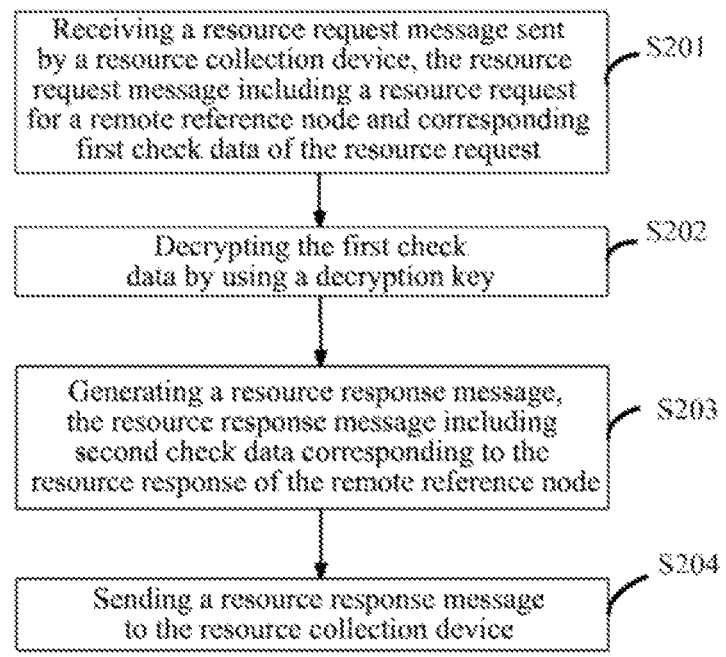
FIG. 6 is another schematic flowchart of a resource request method provided in Embodiment 4 of the present application.

FIG. 6 is another schematic flowchart of a resource request method provided in Embodiment 4 of the present application. In the present embodiment, on the basis of the embodiment 3, the remote reference node sends a resource response to the control device and encrypts the resource response. As shown in FIG. 6, the method in the present embodiment includes following steps:

S203, the remote reference node generates a resource response message, the resource response message including second check data corresponding to the resource response of the remote reference node.

The remote reference node generates the resource response message after verifying that a source of the resource request is reliable. Unlike the related art, the resource response message carries the second check data corresponding to the resource response of the remote reference node.

The second check data is used for the control device to verify whether a source of the resource response of the remote reference node is reliable. The second check data is obtained by encrypting, by the remote reference node with an encryption key, the resource response of the remote reference node.

When a symmetric encryption algorithm is adopted for encryption, the encryption key is a shared key between the remote reference node and the control device. In at least one embodiment, the shared key is a key shared by the control device and a plurality of remote reference nodes, or the shared key is different from shared keys used by other remote reference nodes.

When an asymmetric encryption algorithm is adopted for the encryption, the encryption key is a second private key, or the encryption key is a second private key and a first public key.

When the encryption key is a second private key and a first public key stored on the remote reference node, the remote reference node encrypts the resource response of the remote reference node with the second private key to obtain first encrypted data, and then encrypts the resource response and the first encrypted data with the first public key to obtain second check data. In this way, the resource collection device cannot obtain the resource response of the remote reference node since twice encryption has been performed.

In at least one embodiment, the second check data further includes an identifier of the resource response of the remote reference node, the identifier of the resource response of the remote reference node being used to determine whether the resource response is a replay message. Where the identifier of the resource response for the remote reference node is a serial number or a timestamp.

S204, the remote reference node sends a resource response message to the resource collection device.

In the present embodiment, the remote reference node carries the second check data corresponding to the resource response of the remote reference node in the resource response message, so that the control device verifies whether a source of the resource response is reliable according to the second check data, thus improving security of data transmitted between the control device and the remote reference node.

Based on the above solution, taking an OCF network as an example, several manners of the resource request method in the OCF network are explained below.

Figure 7:
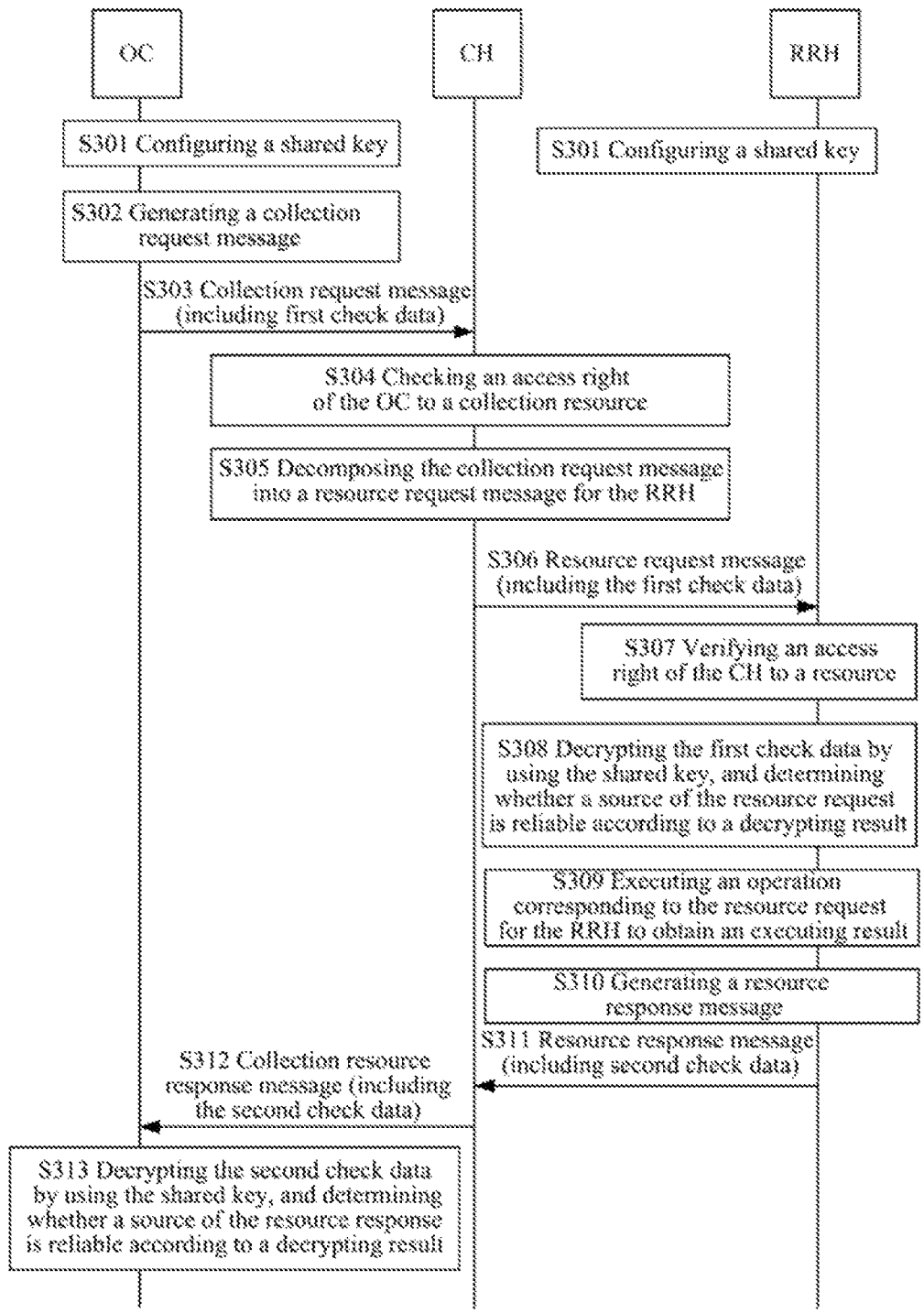
FIG. 7 is another signaling schematic flowchart of a resource request method provided in Embodiment 5 of the present application.

FIG. 7 is a signaling schematic flowchart of a resource request method provided in Embodiment 5 of the present application. In the present embodiment, an OCF network is taken as an example, an OC and an RRH being encrypted by adopting a symmetric encryption algorithm is taken as an example for explanation. As shown in FIG. 7, the method in the present embodiment includes following steps:

S301, the OC and the RRH configure a shared key for the OC and the RRH.

In at least one embodiment, the shared key is a key shared by the OC and a plurality of RRHs, or shared keys of the plurality of RRHs are different.

S302, the OC generates a collection request message which includes a resource request for the RRH and corresponding first check data of the resource request.

The OC first generates the resource request for the RRH and a serial number of the resource request for the RRH, and then encrypts the resource request for the RRH and the serial number of the resource request for the RRH with the shared key to obtain first check data, and carries the resource request for the RRH and the first check data in the collection request message, which may further include other information, for example, an identifier of the OC.

For example, the RRH may be a light 1 (light), and the resource request for the RRH is used to request a switching resource of the light 1. The collection request message may include resource requests for the plurality of RRH.

S303, the OC sends the collection request message to a CH.

S304, the CH checks an access right of the OC to a collection resource.

The CH determines whether the OC has the access right to the collection resource according to an ACE of the OC saved this time. If the OC has the access right, S305 is executed; if the OC does not have the access right, a rejection message is returned to the OC.

S305, the CH decomposes the collection request message into a resource request message for the RRH.

If the collection request message includes the resource requests for the plurality of RRHs, the collection request message is decomposed into the resource request messages for the plurality of RRHs; and the identifier of the OC, the resource request for this RRH and corresponding first check data of the resource request for this RRH are added to the resource request message for the RRH.

The collection request message includes a plaintext resource request for the RRH, i.e., an unencrypted resource request for an RRH. The CH decomposes the collection request message according to the plaintext resource request for the RRH to obtain a resource request message for a respective RRH.

S306, the CH sends a resource request message to the RRH.

The resource request message sent by the CH to the RRH includes the plaintext resource request for the RRH and the first check data.

S307, the RRH verifies an access right of the CH to a resource.

After receiving the resource request message, the RRH verifies the access right of the CH to the resource according to an ACE. If the CH has the access right to the resource, S308 is executed; if the CH does not have the access right to the resource, a rejection message is returned to the CH.

S308, the RRH decrypts the first check data with the shared key, and determines whether a source of the resource request is reliable according to a decrypting result.

The RRH decrypts the first check data with the shared key to obtain the resource request and the serial number, and then determines that the source of the resource request is reliable. The RRH determines whether the decrypted serial number is a new serial number, and if so, it is determined that the resource request is not a replay message, and step S309 is executed.

In at least one embodiment, it can also be determined whether a decrypted resource request is the same as a plaintext resource request carried in the resource request message, if so, it is determined that the resource request is correct, and S309 is executed after it is determined that the resource request is correct. If the decrypted resource request is different from the plaintext resource request carried in the resource request message, it is determined that the resource request is unreliable and verification fails, and the RRH can return a request failure message to CH.

If the decrypted serial number is not a new serial number, it is determined that the resource request message is a replay message. The RRH can return the request failure message to the CH, and in at least one embodiment, the RRH can also report a replay attack event to other devices.

S309, the RRH executes an operation corresponding to the resource request for the RRH to obtain an executing result.

For example, if the operation corresponding to the resource request for the RRH is to turn off the light 1, then the light 1 is turned off. If the operation corresponding to the resource request for the RRH is to turn on the light 1, then the light 1 is turned on. If the operation corresponding to the resource request for the RRH is to adjust color/brightness of the light 1, then the color/brightness of the light 1 is adjusted.

S310, the RRH generates a resource response message which includes second check data corresponding to the resource response of the RRH.

The resource response of the RRH includes the executing result in S309, and the RRH encrypts the resource response of the RRH and the serial number of the resource response of the RRH with the shared key to obtain the second check data, and the serial number in the second check data may be the same as or different from the serial number carried in the first check data.

In at least one embodiment, the resource response message may further include a plaintext resource response.

S311, the RRH sends a resource response message to the CH.

S312, the CH sends a collection response message to the OC.

If the collection request message includes resource requests for a plurality of RRHs, the CH waits to receive resource response messages of all the RRHs, and then packages and sends them to the OC as a whole.

S313, the OC decrypts the second check data with the shared key, and determines whether a source of the resource response is reliable according to a decrypting result.

If the resource response of the RRH and the serial number of the resource response of the RRH are obtained through decryption, it is determined that the source of the resource response is reliable. The OC determines whether the resource response of the RRH is a replay message according to the serial number of the resource response of the RRH, if not. If the OC determines that the resource response of the RRH is a replay message according to the serial number of the resource response of the RRH, a corresponding operation is executed, for example, reporting a replay attack event to an upper layer device, or counting the number of replay messages, which is not limited in the present embodiment.

Figure 8:
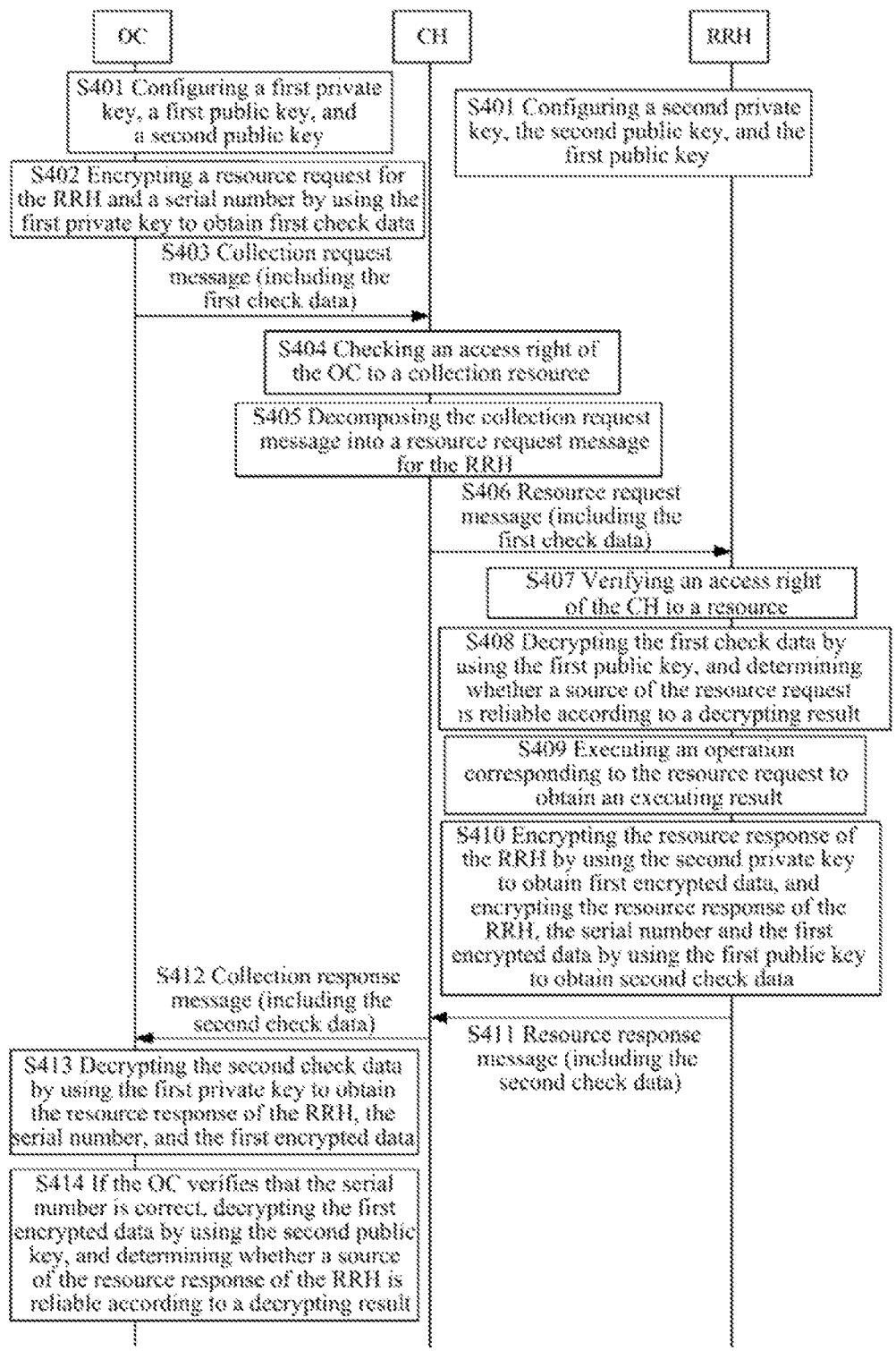
FIG. 8 is another signaling schematic flowchart of a resource request method provided in Embodiment 6 of the present application.

FIG. 8 is another signaling schematic flowchart of a resource request method provided in Embodiment 6 of the present application. In the present embodiment, an OCF network is taken as an example, and an OC and an RRH being encrypted by adopting an asymmetric encryption algorithm is taken as an example for explanation. As shown in FIG. 8, the method in the present embodiment includes following steps:

S401, the OC configures a first private key, a first public key, and a second public key for the OC, and the RRH configures a second private key, the second public key, and the first public key for the RRH.

S402, the OC encrypts a resource request for the RRH and a serial number of the resource request for the RRH with the first private key to obtain first check data.

The OC carries the plaintext resource request and the first check data in a collection request message, and the collection request message further includes an identifier of the OC.

S403, the OC sends the collection request message to a CH.

S404, the CH checks an access right of the OC to a collection resource.

The CH determines whether the OC has the access right to the collection resource according to an ACE of the OC saved this time. If the OC has the access right, S405 is executed; if the OC does not have the access right, a rejection message is returned to the OC.

S405, the CH decomposes the collection request message into a resource request message for the RRH.

If the collection request message includes the resource request for the plurality of RRHs, the CH decomposes the collection request message into resource request messages for the plurality of RRHs according to a plurality of plaintext resource requests for the RRHs included in the collection request message, and adds the identifier of the OC, the plaintext resource request for the RRH and corresponding first check data of the plaintext resource request for the RRH to the resource request message for the RRH.

S406, the CH sends the resource request message to the RRH.

S407, the RRH verifies an access right of the CH to a resource.

After receiving the resource request message, the RRH verifies the access right of the CH to the resource according to an ACE. If the CH has the access right to the resource, S408 is executed; if the CH does not have the access right to the resource, a rejection message is returned to the CH.

S408, the RRH decrypts the first check data with the first public key, and determines whether a source of the resource request is reliable according to a decrypting result.

The RRH queries and obtains the first public key according to the ID of the OC, and decrypts the first check data with the first public key. If a resource request for the RRH and a serial number of the resource request for the RRH are obtained through decryption, it is determined that a source of the resource request is reliable. The RRH can also determine whether the decrypted serial number is a new serial number. If so, it is determined that the resource request for the RRH is not a replay message; if not, it is determined that the resource request message is a replay message.

In at least one embodiment, when it is determined that the resource request for the RRH is not a replay message, it can also be determined whether a decrypted resource request for the RRH is the same as the plaintext resource request carried in the resource request message, if so, it is determined that the resource request for the RRH is correct, and S409 is continued. If the decrypted resource request for the RRH is different from the plaintext resource request carried in the resource request message, it is determined that the resource request for the RRH is incorrect, and the RRH can return a request failure message to the CH.

When the resource request for the RRH is determined to be a replay message, the RRH may return a request failure message to the CH, and in at least one embodiment, the RRH may further report a replay attack event to other devices.

S409, the RRH executes an operation corresponding to the resource request to obtain an executing result.

S410, the RRH encrypts the resource response of the RRH with the second private key to obtain first encrypted data, and encrypts the resource response of the RRH, the serial number of the resource response of the RRH and the first encrypted data with the first public key to obtain second check data.

The RRH encrypts the resource response of the RRH, the serial number of the resource response of the RRH and the first encrypted data with the first public key, so that other devices in the network cannot obtain the resource response of the RRH.

The serial number in the second check data may be the same as or different from the serial number carried in the first check data.

S411, the RRH sends a resource response message to the CH.

The resource response message includes the resource response of the RRH and corresponding second check data of the resource response of the RRH.

S412, the CH sends a collection response message to the OC.

If the collection request message includes resource requests for a plurality of RRHs, the CH waits to receive resource response messages of all the RRHs, and then packages and sends them to the OC as a whole.

S413, the OC decrypts the second check data with the first private key to obtain the resource response of the RRH, the serial number of the resource response of the RRH, and the first encrypted data.

S414, if verifying that the serial number of the resource response of the RRH is correct, the OC decrypts the first encrypted data with the second public key, and determines whether a source of the resource response of the RRH is reliable according to a decrypting result.

If the OC successfully decrypts the first encrypted data with the second public key, it is determined that the source of the resource response of the RRH is reliable. In at least one embodiment, the OC determines whether the resource response of the RRH obtained through the second decryption is the same as the resource response of the RRH obtained through the first decryption, and if so, it is determined that the resource response of the RRH is correct; if the resource response obtained through the second decryption is different from that obtained through the first decryption, it is determined that the resource response of the RRH is incorrect.

It should be noted that in the present embodiment, the OC encrypts the resource request for the RRH with the first private key to obtain the first check data. It can be understood that in other embodiments of the present application, the OC can use the first private key to encrypt first information in the resource request for the RRH to obtain the first check data. In addition, the serial number in the present embodiment can be replaced by a timestamp.

Figure 9:
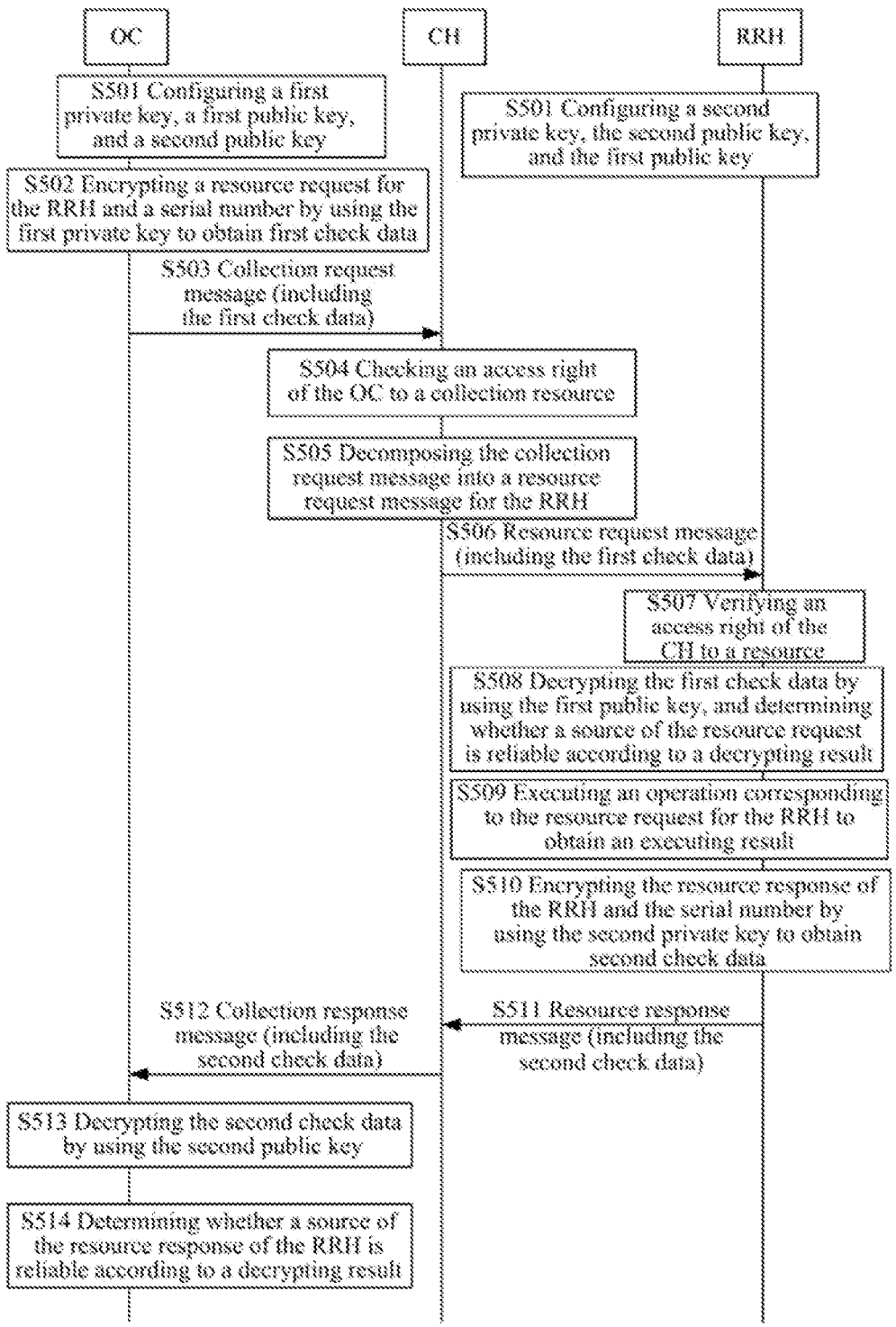
FIG. 9 is another signaling schematic flowchart of a resource request method provided in Embodiment 7 of the present application.

FIG. 9 is another signaling schematic flowchart of a resource request method provided in Embodiment 7 of the present application. Difference between the present embodiment and Embodiment 6 is that in the present embodiment, the RRH only signs the resource response, without encryption. As shown in FIG. 9, the method in the present embodiment includes following steps:

S501, the OC configures a first private key, a first public key, and a second public key for the OC, and the RRH configures a second private key, the second public key, and the first public key for the RRH.

S502, the OC encrypts a resource request for the RRH and a serial number of the resource request for the RRH with the first private key to obtain first check data.

The OC carries the plaintext resource request and the first check data in a collection request message, and the collection request message further includes an identifier of the OC.

S503, the OC sends the collection request message to a CH.

S504, the CH checks an access right of the OC to a collection resource.

S505, the CH decomposes the collection request message into a resource request message for the RRH.

S506, the CH sends the resource request message to the RRH.

S507, the RRH verifies an access right of the CH to a resource.

S508, the RRH decrypts the first check data with the first public key, and determines whether a source of the resource request is reliable according to a decrypting result.

S509, the RRH executes an operation corresponding to the resource request for the RRH to obtain an executing result.

Steps S501 to S509 are the same as steps S401 to S409 in Embodiment 6, which are not described in detail herein.

S510, the RRH encrypts the resource response of the RRH and the serial number of the resource response of the RRH with the second private key to obtain second check data.

Different from Embodiment 4, in the present embodiment, the RRH signs the resource response of the RRH and the serial number of the resource response of the RRH only with the second private key.

S511, the RRH sends a resource response message to the CH.

The resource response message includes a plaintext resource response of the RRH, the second check data, and an identifier of the RRH.

S512, the CH sends a collection response message to the OC.

The CH packages resource response messages sent by a plurality of RRHs to obtain a collection response message.

S513, the OC decrypts the second check data with the second public key.

S514, the OC determines whether a source of the resource response of the RRH is reliable according to a decrypting result.

If the OC decrypts the resource response and the serial number correctly with the second public key, then it is determined that the source of the resource response is reliable. The OC determines whether the resource response of the RRH is a replay message according to the decrypted serial number, if not, determines whether the decrypted resource response of the RRH is the same as the resource response of the RRH included in the collection response message: if so, it is determined that the resource response of the RRH is correct; and if not, it is determined that the resource response of the RRH is incorrect.

Figure 10:
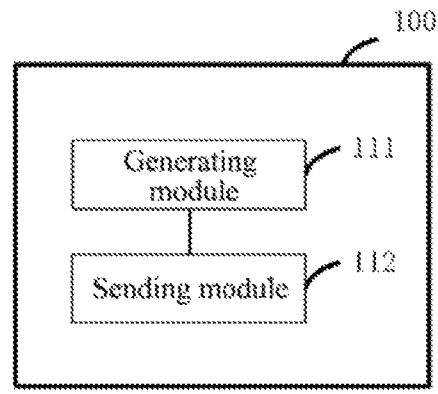
FIG. 10 is a structural schematic diagram of a control device provided in Embodiment 8 of the present application.

FIG. 10 is a structural schematic diagram of a control device provided in Embodiment 8 of the present application. As shown in FIG. 10, the control device 100 includes:

a generating module 111, configured to generate a resource collection request message, the resource collection request message including a resource request for at least one remote reference node and corresponding first check data of the resource request; and a sending module 112, configured to send the resource collection request message to a resource collection device.

In at least one embodiment, the first check data is obtained by encrypting the resource request for the remote reference node with an encryption key by the control device. Or, the first check data is obtained by encrypting first information in the resource request for the remote reference node with an encryption key by the control device, and the first information is used to identify resource requests for different remote reference nodes.

In at least one embodiment, the encryption key is a shared key between the control device and the remote reference node.

Where the shared key is a key shared by the control device and a plurality of remote reference nodes.

Or, a plurality of different shared keys is stored in the control device, and each shared key in the plurality of shared keys corresponds to a remote reference node.

In at least one embodiment, the encryption key is a first private key.

In at least one embodiment, the first check data further includes an identifier of the corresponding resource request for the remote reference node, and the identifier of the corresponding resource request is used by the remote reference node to determine whether the resource request is a replay request.

In at least one embodiment, the identifier of the resource request for the remote reference node is a serial number or a timestamp.

Figure 11:
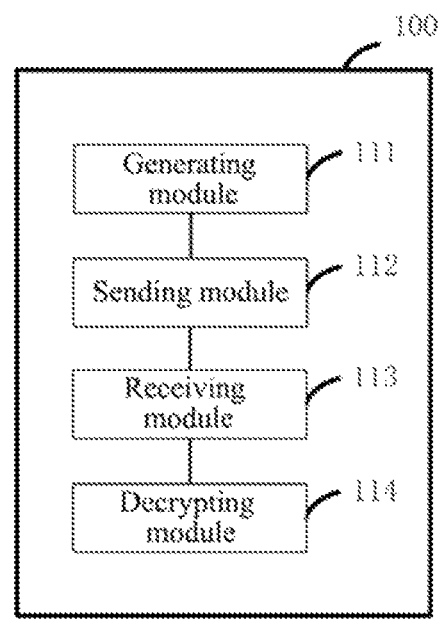
FIG. 11 is a structural schematic diagram of another control device provided in Embodiment 9 of the present application.

FIG. 11 is a structural schematic diagram of another control device provided in Embodiment 9 of the present application. As shown in FIG. 11, the control device 100 further includes:

a receiving module 113, configure to receive a resource collection response message corresponding to the resource collection request message sent by the resource collection device, the resource collection response message including second check data corresponding to a resource response of at least one remote reference node.

a decrypting module 114, configured to decrypt the second check data with a decryption key.

In at least one embodiment, the decryption key is a shared key between the control device and the remote reference node.

Where the shared key is a key shared by the control device and a plurality of remote reference nodes.

Or, a plurality of different shared keys are stored in the control device, and each shared key in the plurality of shared keys corresponds to a remote reference node.

In at least one embodiment, the decryption key includes a first private key and a second public key. Accordingly, the decryption module 114 is specifically configured to:

perform a first decryption on the second check data with the first private key to obtain a resource response of the remote reference node and first encrypted data;

determine the second public key according to an identifier of the remote reference node; and perform a second decryption on the first encrypted data with the second public key to obtain a resource response of the remote reference node In at least one embodiment, a verifying module is further included, and is configured to determine that the resource response of the remote reference node is correct when the resource response of the remote reference node obtained through the first decryption is the same as the resource response of the remote reference node obtained through the second decryption.

In at least one embodiment, the decryption key includes a second public key, and the resource collection response message further includes a resource response of at least one remote reference node. Accordingly, the decrypting module 114 is specifically configured to:

determine the second public key according to an identifier of the remote reference node; and decrypt the second check data with the second public key to obtain a resource response of the remote reference node.

In at least one embodiment, a verifying module is further included, and is configured to determine that the resource response of the remote reference node is correct when the resource response of the remote reference node included in the resource collection response message is the same as the decrypted resource response of the remote reference node.

In at least one embodiment, the second check data further includes an identifier of the resource response of the remote reference node, and the identifier of the resource response is used to determine whether the resource response is a replay message.

The control device provided in any of the above implementations is used to implement the technical solution implemented by the control device in any of the above method embodiments, and its implementation principle and technical effect are similar, which are not described in detail herein.

Figure 12:
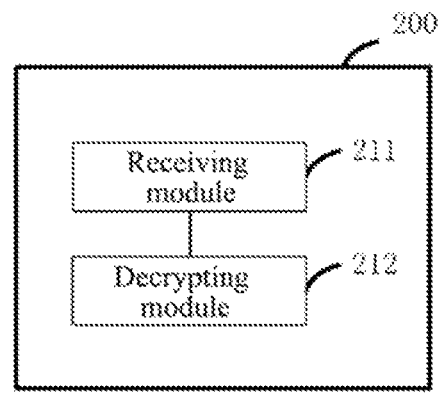
FIG. 12 is a structural schematic diagram of a remote reference node provided in Embodiment 10 of the present application.

FIG. 12 is a structural schematic diagram of a remote reference node provided in Embodiment 10 of the present application. As shown in FIG. 12, the remote reference node 200 includes:

a receiving module 211, configured to receive a resource request message sent by a resource collection device, the resource request message including a resource request for a remote reference node and corresponding first check data of the resource request; and a decrypting module 212, configured to decrypt the first check data with a decryption key.

A decrypting result includes the resource request for the remote reference node or first information in the resource request for the remote reference node, and the first information is used to identify resource requests for different remote reference nodes.

In at least one embodiment, the decryption key is a shared key between the control device and the remote reference node.

Where the shared key is a key shared by the control device and a plurality of remote reference nodes.

Where the shared key is different from shared keys corresponding to other remote reference nodes.

In at least one embodiment, the decryption key is a first public key.

In at least one embodiment, the first check data further includes an identifier of the resource request for the remote reference node, the identifier of the resource request being used to determine whether the resource request is a replay message.

In at least one embodiment, the identifier of the resource request for the remote reference node is a serial number or a timestamp.

Figure 13:
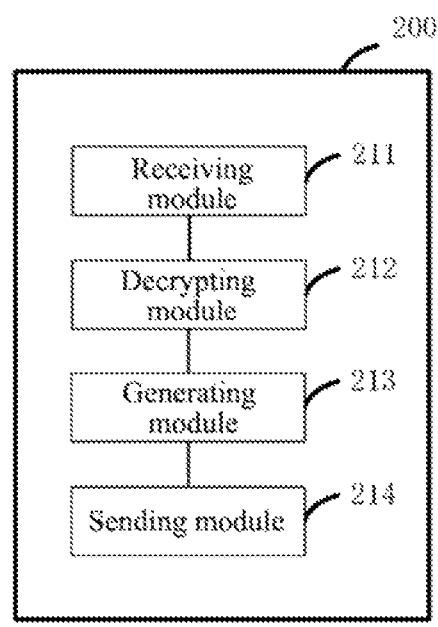
FIG. 13 is a structural schematic diagram of another remote reference node provided in Embodiment 11 of the present application.

FIG. 13 is a structural schematic diagram of another remote reference node provided in Embodiment 11 of the present application. As shown in FIG. 13, on the basis of the device shown in FIG. 12, the remote reference node 200 further includes:

a generating module 213, configured to generate a resource response message, the resource response message including second check data corresponding to the resource response of the remote reference node; and a sending module 214, configured to send the resource response message to the resource collection device.

In at least one embodiment, the second check data is obtained by encrypting the resource response of the remote reference node by the remote reference node with an encryption key.

In at least one embodiment, the encryption key is a shared key between the remote reference node and the control device.

Where the shared key is a key shared by the control device and a plurality of remote reference nodes.

Or, the shared key is different from shared keys corresponding to other remote reference nodes.

In at least one embodiment, the encryption key is a second private key.

In at least one embodiment, the encryption key is a second private key and a first public key, the second private key is used to encrypt the resource response of the remote reference node to obtain first encrypted data, and the first public key is used to encrypt the resource response of the remote reference node and the first encrypted data to obtain the second check data.

In at least one embodiment, the second check data further includes an identifier of the resource response of the remote reference node, and the identifier of the resource response of the remote reference node is used to determine whether the resource response is a replay message.

In at least one embodiment, the identifier of the resource request for the remote reference node is a serial number or a timestamp.

The remote reference node provided in any of the above implementations is used to implement the technical solution implemented by the remote reference node in any of the above method embodiments, and its implementation principle and technical effect are similar, which are not described in detail herein.

An embodiment of the present application further provides a resource collection device, including:

a receiving module, configured to receive a resource collection request message sent by a control device, the resource collection request message including a resource request for at least one remote reference node and corresponding first check data of the resource request;

a decomposing module, configured to decompose the resource collection request message into a resource request message for each remote reference node, the resource request message for each remote reference node including a resource request for the remote reference node and first check data of the resource request; and a sending module, configured to send a corresponding resource request message to each remote reference node.

Figure 14:
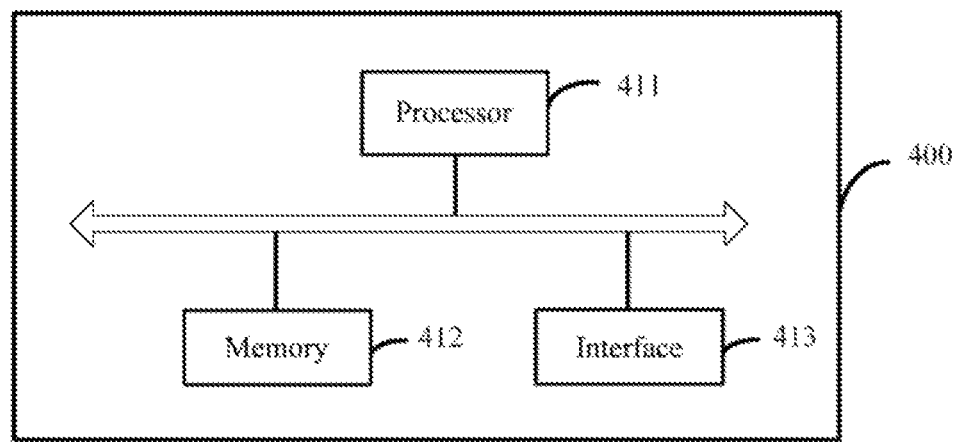
FIG. 14 is a structural schematic diagram of yet another control device provided in Embodiment 12 of the present application.

FIG. 14 is a structural schematic diagram of yet another control device provided in Embodiment 12 of the present application. As shown in FIG. 14, the control device 400 includes:

a processor 411, a memory 412, and an interface 413 for communicating with a resource collection device;

the memory 412 stores a computer executable instruction; and the processor 411 executes the computer executed instruction stored in the memory, causing the processor 411 to execute the technical solution executed by the control device in any of the method embodiments described above.

FIG. 14 is a simple design of a control device. The embodiment in the present application does not limit the numbers of processors and memories in the control device, and FIG. 14 only takes the number being 1 as an example.

Figure 15:
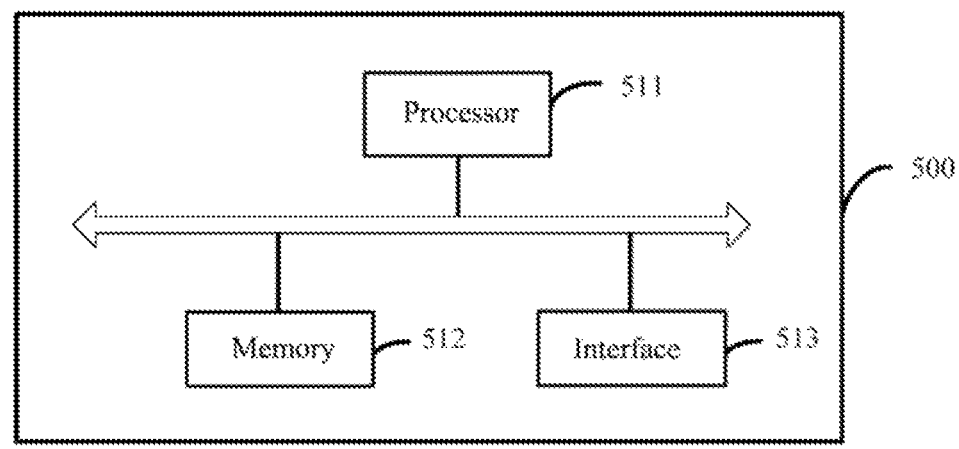
FIG. 15 is a structural schematic diagram of yet another remote reference node provided in Embodiment 13 of the present application.

FIG. 15 is a structural schematic diagram of yet another remote reference node provided in Embodiment 13 of the present application. As shown in FIG. 15, the remote reference node 500 includes:

a processor 511, a memory 512, and an interface 513 for communicating with a resource collection device;

the memory 512 stores a computer executable instruction; and the processor 511 executes the computer executed instruction stored in the memory 512, causing the processor 511 to execute the technical solution executed by the remote reference node in any of the method embodiments described above.

FIG. 15 is a simple design of a remote reference node. The embodiment in the present application does not limit the number of processors and memories in the remote reference node, and FIG. 15 only takes the number being 1 as an example.

In a specific implementation of the control device shown in FIG. 15 or the remote reference node shown in FIG. 16, the memory, the processor, and the interface may be connected through a bus, and in at least one embodiment, the memory may be integrated inside the processor.

An embodiment of the present application further provides a resource collection device, including:

a processor, a memory, and an interface for communicating with a terminal device;

the memory stores a computer executable instruction; and the processor executes the computer executable instruction stored in the memory, causing the processor to execute the technical solution executed by the resource collection device in any of the method embodiments described above.

An embodiment in the present application further provides a computer readable storage medium, in which a computer executable instruction is stored, and when executed by a processor, the computer executable instruction is used to implement the technical solution executed by the control device in any of the method embodiments described above.

An embodiment in the present application further provides a computer readable storage medium, in which a computer executable instruction is stored, and when executed by a processor, the computer executable instruction is used to implement the technical solution executed by the remote reference node in any of the method embodiments described above.

An embodiment in the present application further provides a computer readable storage medium, in which a computer executable instruction is stored, and when executed by a processor, the computer executable instruction is used to implement the technical solution executed by the resource collection device in any of the method embodiments described above.

An embodiment in the present application further provides a program, which, when executed by a processor, is used to execute the technical solution executed by the control device in any of the method embodiments described above.

An embodiment in the present application further provides a program, which, when executed by a processor, is used to execute the technical solution executed by the remote reference node in any of the method embodiments described above.

An embodiment in the present application further provides a program, which, when executed by a processor, is used to execute the technical solution executed by the resource collection device in any of the method embodiments described above.

In at least one embodiment, the processor may be a chip.

The embodiment of the present application further provides a computer program product, which includes a program instruction, and the program instruction is used to implement the technical solution executed by the control device in any of the method embodiments described above.

The embodiment of the present application further provides a computer program product, which includes a program instruction, and the program instruction is used to implement the technical solution executed by the remote reference node in any of the method embodiments described above.

The embodiment of the present application further provides a computer program product, which includes a program instruction, and the program instruction is used to implement the technical solution executed by the resource collection device in any of the method embodiments described above.

The embodiment of the present application further provides a chip, which includes a processing module and a communication interface, the processing module being able to execute the technical solution executed by the control device in any of the method embodiments described above.

Further, the chip further includes a memory module (e.g., memory), the memory module being able to store an instruction, the processing module being used to execute the instruction stored in the memory module, and an execution of the instruction stored in the memory module causes the processing module to execute the technical solution executed by the control device in any of the method embodiments described above.

The embodiment of the present application further provides a chip, which includes a processing module and a communication interface, the processing module being able to execute the technical solution executed by the remote reference node in an of the method embodiments described above.

Further, the chip further includes a memory module (e.g., memory), the memory module being able to store an instruction, the processing module being used to execute the instruction stored in the memory module, and an execution of the instruction stored in the memory module causes the processing module to execute the technical solution executed by the remote reference node in any of the method embodiments described above.

The embodiment of the present application further provides a chip, which includes a processing module and a communication interface, the processing module being able to execute the technical solution executed by the resource collection device in any of the method embodiments described above.

Further, the chip further includes a memory module (e.g., memory), the memory module being able to store an instruction, the processing module being used to execute the instruction stored in the memory module, and an execution of the instruction stored in the memory module causes the processing module to execute the technical solution executed by the resource collection device in any of the method embodiments described above.

In several embodiments provided in the present application, it should be understood that the disclosed device and method may be realized in other ways. For example, device embodiments described above are only schematic. For example, module division is only a logical function division.

In an actual implementation, there may be another division mode, for example, a plurality of modules may be combined or integrated into another system, or some features may be ignored or not executed. On the other hand, mutual coupling or direct coupling or communication connection shown or discussed may be indirect coupling or communication connection through some interfaces and modules, and may be in electrical, mechanical or other forms.

In a specific implementation of the above terminal device and network device, it should be understood that a processor may be a central processing unit (English: Central Processing Unit, for short: CPU), other general-purpose processors, a digital signal processor (English: Digital Signal Processor, for short: DSP), an application specific integrated circuit (English: Application Specific Integrated Circuit, for short: ASIC), etc. The general-purpose processor may be a microprocessor or the processor may be any conventional processor. Steps of the method disclosed in the present application may be directly embodied as completion of being executed by a hardware processor, or by a combination of hardware and software modules in a processor.

All or part of steps for implementing the method embodiments described above may be completed by hardware related to a program instruction. The aforementioned program may be stored in a readable memory. When the program is executed, steps including the above method embodiments are executed; and the aforementioned memory (storage medium) includes: a read-only memory (English: read-only memory, for short: ROM), RAM, a flash memory a hard disk, a solid state disk, a magnetic tape (English: magnetic tape), a floppy disk (English: floppy disk), an optical disc (English: optical disc), and any combination thereof.

What is claimed is:

1. A resource request method applied to a control device, the method comprising:
generating, by the control device, a resource collection request message, wherein the resource collection request message comprises a resource request for at least one remote reference node and corresponding first check data of the resource request, and the corresponding first check data is obtained by encrypting the resource request for the at least one remote reference node with an encryption key by the control device; and
sending, by the control device, the resource collection request message to a resource collection device.

2. The method according to claim 1, wherein the encryption key is a shared key between the control device and the at least one remote reference node.

3. The method according to claim 1, wherein the corresponding first check data further comprises an identifier of the corresponding resource request for the at least one remote reference node, and the identifier of the corresponding resource request is used by the at least one remote reference node to determine whether the resource request is a replay request.

4. The method according to claim 1, wherein the resource collection request message is further sent to each remote reference node of the at least one remote reference node by the resource collection device.

5. The method according to claim 1, wherein the corresponding first check data is used to identify the control device sending the resource collection request message for the at least one remote reference node.

6. A resource request method applied to a remote reference node, the method comprising:
receiving, by the remote reference node, a resource request message sent by a resource collection device, wherein the resource request message comprises a resource request for the remote reference node and corresponding first check data of the resource request; and
decrypting, by the remote reference node, the first check data with a decryption key, wherein the decryption key is a shared key between a control device and the remote reference node.

7. The method according to claim 6, wherein a decrypting result comprises the resource request for the remote reference node or first information in the resource request for the remote reference node, and the first information is used to identify resource requests for different remote reference nodes.

8. The method according to claim 6, wherein the first check data further comprises an identifier of the resource request for the remote reference node, and the identifier of the resource request is used to determine whether the resource request is a replay message.

9. The method according to claim 6, wherein the resource collection request message sent by the resource collection device is received from the control device.

10. The method according to claim 6, wherein the first check data is obtained by encrypting the resource request for the remote reference node with an encryption key by the control device.

11. The method according to claim 10, wherein the first check data is used to identify the control device sending the resource collection request message for the remote reference node.

12. A control device, comprising:
a processor, a memory, and an interface for communicating with a network device;
the memory stores a computer executable instruction; and
the processor executes the computer executable instruction stored in the memory, causing the processor to:
generate a resource collection request message, wherein the resource collection request message comprises a resource request for at least one remote reference node and corresponding first check data of the resource request, wherein the corresponding first check data further comprises an identifier of the corresponding resource request for the at least one remote reference node, and the identifier of the corresponding resource request is used by the at least one remote reference node to determine whether the resource request is a replay request; and
send the resource collection request message to a resource collection device.

13. The device according to claim 12, wherein the corresponding first check data is obtained by encrypting the resource request for the at least one remote reference node with an encryption key by the control device.

14. The device according to claim 13, wherein the encryption key is a shared key between the control device and the at least one remote reference node.

15. The device according to claim 12, wherein the resource collection request message is further sent to each remote reference node of the at least one remote reference node by the resource collection device.

16. The device according to claim 13, wherein the corresponding first check data is used to identify the control device sending the resource collection request message for the at least one remote reference node.

* * * * *